United States Patent
Norris et al.

(10) Patent No.: US 10,776,364 B1
(45) Date of Patent: Sep. 15, 2020

(54) PROCESSING STREAMING DATA IN A TRANSACTION-BASED DISTRIBUTED DATABASE SYSTEM

(71) Applicant: Palantir Technologies Inc., Palo Alto, CA (US)

(72) Inventors: Ryan Norris, London (GB); Christopher Harding, Manchester (GB); Omar Ali, Singapore (SG)

(73) Assignee: Palantir Technologies Inc., Palo Alto, CA (US)

( * ) Notice: Subject to any disclaimer, the term of this patent is extended or adjusted under 35 U.S.C. 154(b) by 300 days.

(21) Appl. No.: 15/962,998

(22) Filed: Apr. 25, 2018

Related U.S. Application Data (60) Provisional application No. 62/542,716, filed on Aug. 8, 2017.

(51) Int. Cl.
*G06F 16/2455* (2019.01)
*G06F 16/23* (2019.01)
(Continued)

(52) U.S. Cl.
CPC .... *G06F 16/24568* (2019.01); *G06F 16/2379* (2019.01); *G06F 16/2474* (2019.01); *G06F 16/1865* (2019.01)

(58) Field of Classification Search
CPC .......... G06F 16/24568; G06F 16/2379; G06F 16/2474; G06F 16/1865
See application file for complete search history.

(56) References Cited

U.S. PATENT DOCUMENTS 8,326,743 B1 *  12/2012  Smith ................... G06Q 40/04
                                                                705/37
9,141,930 B2 *   9/2015  Suvernev ............... G06F 9/466
(Continued)

OTHER PUBLICATIONS

Meehan et al., "S-Store: Streaming Meets Transaction Processing", Proceedings of the VLDB Endowment, vol. 8, No. 13, dated Sep. 1, 2015, pp. 2134-2145. Kanrar et al., "Video Traffic Flow Analysis in Distributed System during Interactive Session", Hindawi Publishing Corporation Advances in Multimedia, vol. 2016, Article ID 7829570, 15 pages.

(Continued)

*Primary Examiner* — Miranda Le
(74) *Attorney, Agent, or Firm* — Hickman Palermo Becker Bingham LLP (57) ABSTRACT

Techniques for implementing a streaming transaction in a transaction based data storage system is disclosed. In an embodiment, a server computer system stores a dataset comprising a plurality of files where the dataset comprises a corresponding version number. The server computer system receives a command to modify the dataset and, in response, starts a streaming transaction for the dataset. During the streaming transaction, the server computer system receives a plurality of updates to the dataset, wherein each of the plurality of updates modifies one or more files of the plurality of files. The server computer system executes the plurality of updates in the dataset without modifying the corresponding version number of the dataset. When the server computer system commits the streaming transaction to the dataset, the server computer system increments the corresponding version number of the dataset.

11 Claims, 4 Drawing Sheets

(51) Int. Cl.
*G06F 16/2458* (2019.01)
*G06F 16/18* (2019.01)

(56) References Cited

U.S. PATENT DOCUMENTS

| | | |
|---|---|---|
| 2009/0063548 A1 | 3/2009 | Rusher et al. |
| 2010/0049715 A1* | 2/2010 | Jacobsen ................. G06F 16/27 |
| | | 707/704 |
| 2011/0153566 A1* | 6/2011 | Larson ................ G06F 16/2322 |
| | | 707/638 |

OTHER PUBLICATIONS

European Patent Office, "Search Report" in application No. 18187073.4-1217, dated Nov. 15, 2018, 8 pages.

European Claims in application No. 18187073.4-1217, dated Nov. 2018, 5 pages.

\* cited by examiner

PROCESSING STREAMING DATA IN A TRANSACTION-BASED DISTRIBUTED DATABASE SYSTEM

BENEFIT CLAIM

This application claims the benefit under 35 U.S.C. 119(e) of provisional application 62/542,716, filed Aug. 8, 2017, the entire contents of which are hereby incorporated by reference as if fully set forth herein.

FIELD OF THE DISCLOSURE

The present disclosure relates to computer-implemented distributed database systems that can receive and acting on continuous input data streams such as data resulting from continuously executed queries. The disclosure also relates to transaction-based distributed database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A data pipeline system is a distributed data storage system that may include a plurality of datasets and that is programmed or capable of executing specified transformations of raw datasets or derived datasets into other derived datasets. A dataset is a digital representation of a set of files and metadata regarding the set of files. A dataset may store multiple versions of a file as the file is updated.

To provide version control and efficient access, datasets are updated using a transaction based system. Transactions allow for discrete updates to a dataset. When a transaction is opened, the server computer system grants permission to one or more computing devices and/or programs to update a dataset. While the transaction is open, updates may be received for the dataset, but are not viewable until the transaction is committed. When the transaction is committed, the state of the dataset is finalized and the dataset is viewable to other users and programs. A version number of the dataset is incremented to indicate that a new version of the dataset has been stored. Two-phase commit is a common technique in relational database systems for ensuring that only committed changes become usable.

Datasets may be modified by different types of transactions. A snapshot transaction replaces all files in the dataset with a new version or stores a snapshot of all the current files in the dataset. An append transaction adds a new version to an existing file or existing files in a dataset. An update transaction adds a new file to a dataset. Each transaction is identified by the version number and/or a transaction identifier.

When a query is received for data from the dataset, the server computer system uses the transactional nature of the system to build a dataset. First, the server computer system identifies a snapshot of the dataset. Second, the server computer system identifies each transaction that occurred after the snapshot of the dataset. Finally, the server computer system builds the dataset by applying the identified transactions to the identified snapshot of the dataset. By storing updates as completed transactions, the server computer system can effectively roll back the dataset to any transaction identifier.

While transaction based updates are useful for efficiently responding to queries and performance of version control, the transaction based nature is less effective for low-latency data requirements. Some types of datasets, such as financial market pricing datasets, are most effective when they are updated frequently as prices may change rapidly. Ideally, an application accessing financial market pricing datasets would receive real-time values, thereby effectively matching the values queried from the dataset to the current financial market prices.

While a transaction is open and not fully committed, the updates in the transaction are not visible to other applications or computing devices. Thus, to use a transaction based system to provide low-latency data, a server computer system must open transactions, update data, and commit the transactions at the speed at which the data changes, thereby requiring the opening and committing of a relatively large number of transactions in a short period. The opening and closing of many transactions to deliver real-time data is extremely computationally expensive and inefficient.

Thus, there is a need for a technique for handling streaming updates while maintaining the benefits of a transaction based system.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form to avoid unnecessarily obscuring the present disclosure.

Embodiments are described in sections below per the following outline:
General Overview
System Overview
Streaming Transaction
Query Processing
Dependencies
Implementation Example—Hardware Overview
Implementation Example—Basic Software System
Extensions and Alternatives
General Overview Techniques for handling streaming updates while maintaining the benefits of a transaction based system are described herein. In an embodiment, a server computer system stores a dataset comprising a plurality of files. The server computer system receives a request to open a streaming transaction for the dataset. While the streaming transaction is open, the server computer system receives updates to the data in the dataset. The server computer system applies those updates to the data in the dataset without incrementing a version number of the dataset or individual files. If a query for data from the dataset is received while the streaming transaction is open, the server computer system determines that the dataset has an open streaming transaction. The server computer system builds the dataset using prior transactions as well as any updates that have occurred within the open streaming transaction. When the server computer system commits the transaction, a version number of the dataset is incremented.

In an embodiment, a method comprises storing a dataset comprising a plurality of files, wherein the dataset comprises a corresponding version number; receiving a command to modify the dataset; in response to receiving the command to modify the dataset, starting a streaming transaction for the dataset; during the streaming transaction, receiving a plurality of updates to the dataset, wherein each update of the plurality of updates modifies one or more files of the plurality of files; during the streaming transaction, executing, in the dataset, each update of the plurality of updates as it is received without modifying the corresponding version number of the dataset; committing the streaming transaction to the dataset, wherein committing the streaming transaction comprises incrementing the corresponding version number of the dataset; wherein the method is performed using one or more processors.

System Overview

Figure 1:
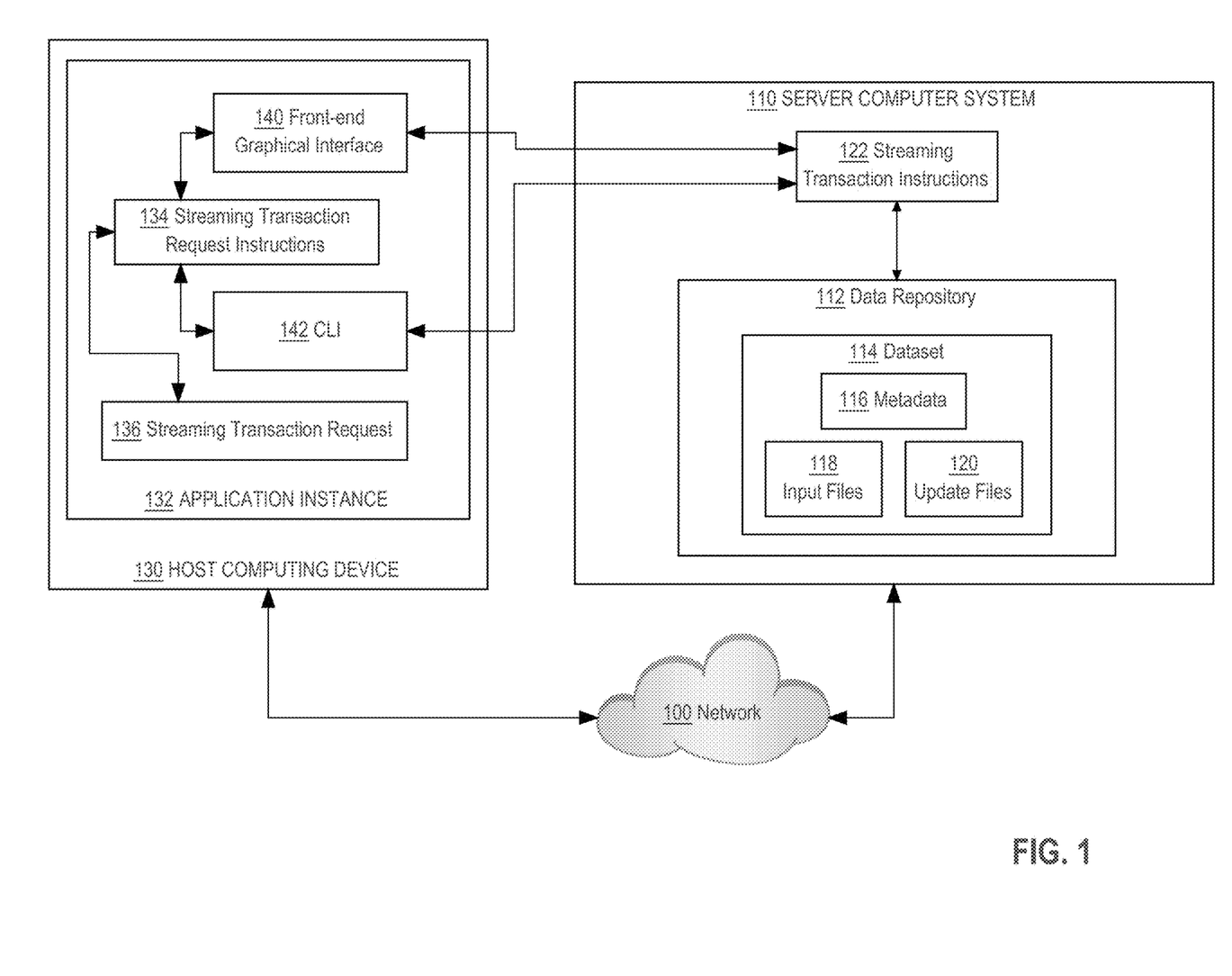
FIG. 1 depicts a schematic diagram of a distributed computing system for performance of searches for resources.

FIG. 1 depicts a schematic diagram of a distributed computing system for performance of searches for resources.

In an embodiment, a distributed computing system comprises a server computer ("server") 110 coupled via network 100 to a host computing device 130. The distributed computing environment can be within one or more data center, virtual computing facility or other hosting facilities connected to a network such as, for example, the Internet or other network; other embodiments can be within a networked home, office, or campus.

Network 100 broadly represents a combination of one or more local area networks, wide area networks, and/or internetworks and may include the public internet. The network 100 can connect multiple hosts 130 together within the distributed computing environment. Network 100 can be composed of multiple sub-networks connected. For example, the network 100 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as, for example, the computing device 300 described below with respect to FIG. 3. Alternatively, a host 130 can be a single virtual computer instance that executes on a computing device facilitated by a virtualization layer interposed between the virtual computer instance and the computing device. The virtualization layer can be a virtual machine monitor such as, for example, virtual machine monitor 430 described below with respect to FIG. 4.

Regardless if a single computing device or a single virtual computer instance, a host 130 can be configured with an operating system such as, for example, operating system 410 described below with respect to FIG. 4. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g. the DOCKER container system) for running services within containers on the host's operating system.

Services that execute as processes on hosts in the distributed computing environment may be configured using the distributed configuration platform described herein or in application Ser. No. 15/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises streaming transaction request instructions 134, a front-end graphical interface 140 and a command-line interface (CLI) 142 that may interoperate to provide the functions that are described further herein. In an embodiment, the front-end interface 140 and CLI 142 are programmed or configured to interact with one or more server-side functional units of server computer 110 as further described. Host computing device 130 also manages one or streaming transaction requests 136 using processes that are further described in other sections.

A service that application instance 132 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In an embodiment, server 110 comprises data repository 112 comprising one or more datasets 114, each of which comprising metadata 116, input files 118, and update files 120 as further described. In an embodiment, streaming transaction instructions 122, when executed by one or more processors, are programmed or configured to cause server computer system 110 to execute a streaming transaction by receiving electronic digital messages that define updates to one or more files in a dataset, perform updates to the dataset while holding the transaction open for receiving further updates, receive queries to the dataset, and respond to the queries with a current version of the dataset prior to committing the streaming transaction. Typically, execution of the query operations causes instructing one or more worker processes to execute builds of derived datasets, based on raw datasets, with data repository 112.

In an embodiment data repository 112 comprises a distributed data storage system which stores datasets comprising one or more files. The files may comprise one or more of individual documents, folders, JSON blobs, rows in a database, user comments or flags, media files, build artifacts, and/or any other digital resource. Data repository 112 comprises one or more datasets 114. A dataset is a logical collection of highly structured, semi-structured, or unstructured data. The one or more datasets include input files 118 that include the initial data of datasets. The one or more datasets may also include update files 120 that identify updates to the files in the input files 118. For example, update files may identify transformations of a dataset and/or data to append to the dataset. The files may comprise one or more of individual documents, folders, JSON blobs, rows in a database, user comments or flags, media files, build artifacts, and/or any other digital resource. The one or more datasets may additionally include metadata 116. Metadata 116 may identify dependencies of a dataset, snapshot identifiers of a dataset, and/or transaction identifiers identifying transactions that have occurred with respect to the dataset.

In an embodiment, streaming transaction instructions 122 comprises a set of one or more pages of main memory, such as RAM, in the server 110 into which executable instructions have been loaded and which when executed cause the server to perform the functions or operations that are described herein regarding those modules. For example, streaming transaction instructions 122 may comprise a set of pages in RAM that contain instructions which when executed cause performing the streaming transaction functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, streaming transaction instructions 122 also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein regarding those modules. In other words, the drawing figure may represent the way programmers or software developers organize and arrange source code for later compilation into an executable, or interpretation into bytecode or the equivalent, for execution by the server 110.

Streaming Transaction

Figure 2:
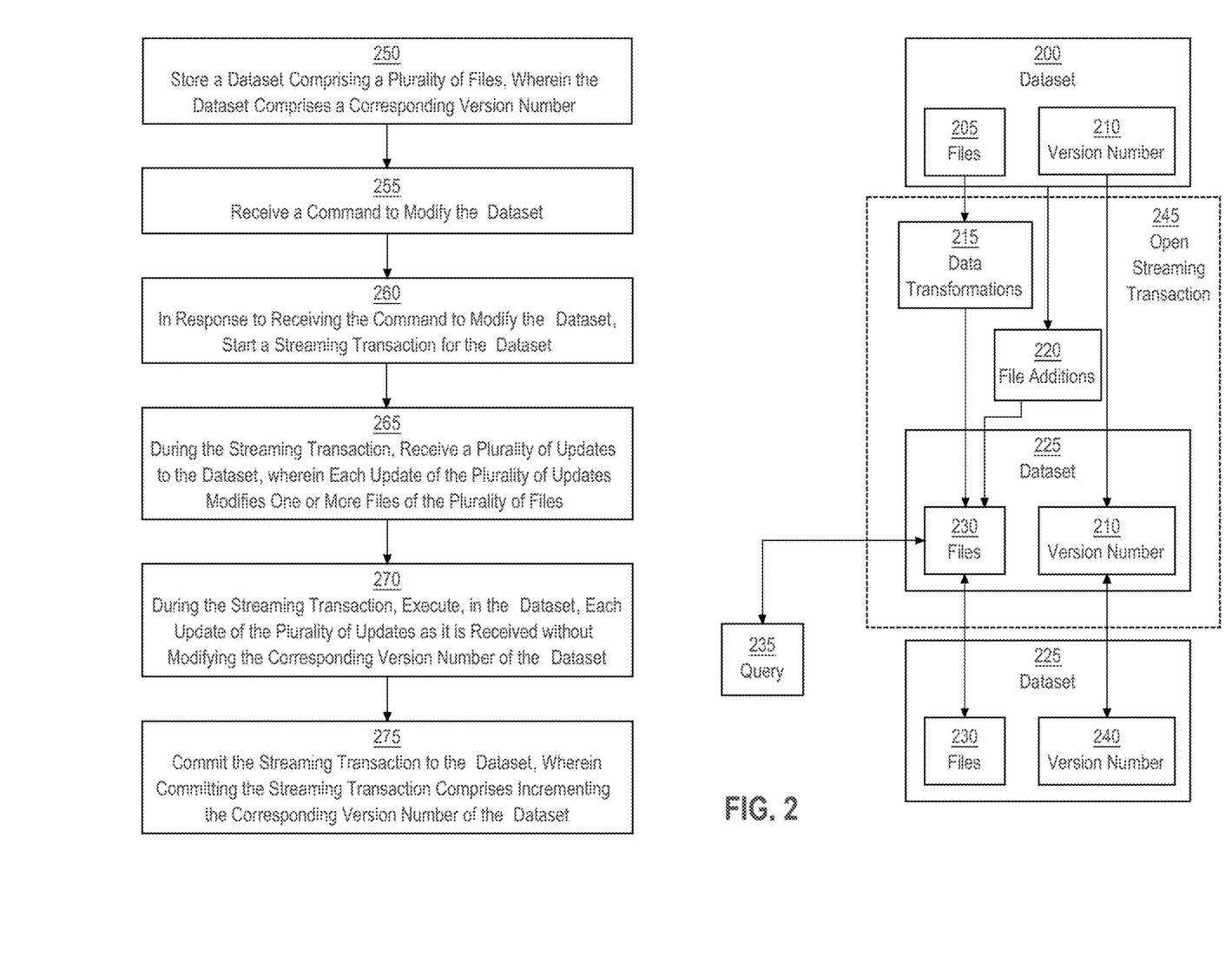
FIG. 2 depicts a method for implementing a streaming transaction into a versioned dataset system.

FIG. 2 depicts a method for implementing a streaming transaction into a versioned dataset system.

FIG. 2 and any other flow diagram or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

At step 250, a dataset comprising a plurality of files is stored, wherein the dataset comprises a corresponding version number. In an embodiment, a data comprises a plurality of files stored in a data repository. The files may comprise one or more of individual documents, folders, JSON blobs, rows in a database, user comments or flags, media files, build artifacts, and/or any other digital resource. A server computer system may be configured to respond to queries using data stored in the files of the dataset.

The server computer may also store update files as part of the dataset. The update files may indicate changes to the dataset from one or more transactions. The changes to the dataset may include augmenting values of the input files and/or adding values to the input files. For example, a stock dataset may include input files identify stock values for a plurality of companies. The update files may indicate changes to the stock values for different transactions. Thus, a first update file may indicate that the stock value for a particular company increased by three points at a first transaction identifier and decreased by two points at a second transaction identifier. The update files may be stored as separate transaction records and/or stored as updates to the input files. As another example, an update file may identify one or more rows of data to append to a dataset, such as a row for a new company in a company valuation dataset.

The server computer may additionally store metadata for each dataset. In an embodiment, the metadata includes one or more transaction identifiers for the dataset. The transaction identifiers may be used for version control to identify transactions that have modified the dataset. The metadata may be used to identify transactions that have occurred since a particular snapshot of the dataset. For example, assume transactions T1 and T2 occur after a first snapshot of the dataset and transactions T3 and T4 occurred after a second snapshot of the dataset. If a request is received for data from the dataset after transaction T2, the server computer may identify the dataset at the first snapshot and apply transactions T1 and T2. If a request is received for data from the dataset after transaction T3, the server computer may identify the dataset at the second snapshot and apply transaction T3.

A snapshot of the dataset, as used herein, refers to a version of the dataset that is stored by the server computer. The version of the dataset may be stored as separate files and/or as identifiers of the update files that encompass the snapshot of the dataset. As an example, the server computer may store multiple snapshots of a dataset after one or more transactions have altered the dataset either automatically or manually. Transaction records may be stored for transactions that occur between snapshots. The metadata stored with a dataset may comprise identifiers of snapshots of the dataset. The identifiers may be particular transaction identifiers and/or separate snapshot identifiers.

In an embodiment, the metadata further identifies dependencies of the dataset. For example, the server computer system may store multiple versions of a dataset. the server computer may identify, for a particular version of a dataset, one or more prior versions of the dataset and/or one or more other datasets used to build the dataset. The metadata for a dataset may additionally identify each additional dataset that is dependent on the dataset. For example, if the dataset is used in combination with a second dataset to build a third dataset, the metadata for the dataset may identify the third dataset as dependent on the dataset. By identifying dependencies for a dataset, the metadata allows the server computer to invalidate datasets that are based on an updated dataset and/or update the dataset that are based on an updated dataset.

As an example, dataset 200 stores files 205 and version number 215. The files 205 may include input files and/or update files for the dataset. The version number 210 may be stored as metadata for the dataset 200. The version number 210 may refer to a version number of the entire dataset and/or version numbers of individual files in the dataset. In an embodiment, the version number is associated with one or more transaction identifiers identifying transactions that occurred to create the particular version of the dataset.

At step 255, a command is received to modify the dataset. For example, a host computing device may create, via user input, or a programmatic call from an application instance or an external program, a streaming transaction request that identifies a particular dataset. Requesting a streaming transaction also may be performed using a frontend graphical interface, which may be programmed to provide forms, GUI widgets, or other facilities to specify transactions to perform with respect to a dataset. Additionally or alternatively, the streaming transaction may be received as a programmatic call from a script, control program, or other system that operates according to a schedule using specified parameters. For example, the server computer system may execute a program which automatically updates a dataset of stock values at particular times during a day.

At step 260, in response to receiving the command to modify the dataset, a streaming transaction is started for the dataset. The server computer system may open a streaming transaction with respect to the dataset. Opening the streaming transaction may involve granting privileges to one or more applications and/or computing devices to update data in the dataset. The server computer system may lock the dataset for editing by any service, program, or computing device that is not identified in the request for a streaming transaction. For example, if the requested streaming transaction includes updating the dataset based on values received from only a first computing device, then a second computing device may be unable to affect changes to the dataset until the streaming transaction is closed.

As an example, the server computer system may create open streaming transaction 245 in which dataset 200 may be updated. In an embodiment, the server computer system additionally stores data indicating that a streaming transaction is open for the particular dataset. For example, the server computer may add an identifier to the metadata of the dataset indicating that a streaming transaction has been opened.

In an embodiment, the server computer system builds a dataset from input files and update files in response to the command to modify the dataset. For example, the server computer system may identify values for each field in the dataset based on input files and update files. The values for each field may then be displayed on a client computing device, thereby allowing a user to specify updates based on current data. Additionally or alternatively, the identified values may be used to create update records based on received data. For example, the server computer system may identify the difference between a value received from an external computing device and a corresponding value in the dataset. The identified difference may then be stored as an update to a field with the corresponding value.

At step 265, during the streaming transaction, a plurality of updates to the dataset is received, wherein each update of the plurality of updates modifies one or more files of the plurality of files. The updates may transform values in the dataset and/or add values to the dataset. For example, a first update request may be received which adds additional rows to a dataset. A second update request may be received which transforms data in a particular column of the dataset. A third update request may be received which merges two different datasets. The updates may be received through one or more applications and/or computing devices.

Updates may include data transformations 215 and file additions 220. Data transformations 215 refer to processes which alter data in one or more files in the dataset. File additions 220 refer to processes that add files to dataset 200. During the open streaming transaction 245, the server computer system may receive one or more data transformations 215 or file additions 220 for augmenting dataset 200.

At step 270, during the streaming transaction, each update of the plurality of updates is executed as it is received without modifying the corresponding version number of the dataset. For example, the server computer system may update the dataset based on the update requests. Updating the dataset may including generating update files identifying each update of the received updates and/or storing additional files with the input files. Additionally or alternatively, updating the dataset may include altering stored values in one or more files. For example, a server computer system may adjust a current value field based on an updated value. In the example of FIG. 2, dataset 200 is updated to dataset 225 in the open streaming transaction 245. The updated dataset 225 comprises files 230 which differ from files 205 and version number 210 which is the same version number as in dataset 200. Thus, while the files are updated in the open streaming transaction, the version number is not.

In an embodiment, updates that add a file are stored separately prior to application to the dataset. For example, if the server computer system receives an update that adds a portion of a file, the server computer system may store the portion of the file in temporary storage without applying the updates to the dataset. The server computer system may be programmed or configured to wait until the full file is received before updating the dataset with the file, thereby avoiding partial updates to the dataset during a streaming transaction.

During the streaming transaction, the server computer system does not increment a version number for the files and/or the dataset. For example, a transaction identifier for the streaming transaction may not be stored in the dataset metadata until the transaction is completed. Additionally or alternatively, a version number for the files or dataset may not be incremented during the processing of the transaction. Thus, the transaction is treated as having not been committed until the streaming transaction has been closed.

In an embodiment, while the streaming transaction is open, only the computing system and/or applications which have been granted permission to make changes to the dataset can request updates. Thus, for a different user to request updates to the dataset, the streaming transaction is closed and a new transaction is opened which grants permissions to the different user. Thus, while updates are applied to the dataset during the streaming transaction, the streaming transaction is not treated as being finished until the streaming transaction is committed.

At step 275, the streaming transactions is committed to the dataset, wherein committing the streaming transaction comprises incrementing the corresponding version number of the dataset. The version number of the dataset may refer to an aggregate version number of the dataset and/or version numbers for individual files. In an embodiment, the version number of the dataset is separate from the transaction identifier which identifies transactions that have updated the dataset. Additionally or alternatively, the transaction identifier may be used as a version number of the dataset. Thus, committing the transactions to the dataset may additionally comprise storing a new transaction identifier which is associated with updates made to the dataset during the streaming transaction. As an example, in FIG. 2, when the open streaming transaction 245 closes, the dataset 225 with the updated files 230 is stored with an incremented version number 240.

In an embodiment, the server computer system aggregates updates made during the streaming transaction into one or more files when the streaming transaction is committed to the dataset. For example, the server computer system may receive a plurality of updates to different elements of the dataset. The updates may be received as a plurality of different files. The server computer system may aggregate a plurality of updates to a single file, thereby reducing the number of files stored by the server computer system. Additionally, by aggregating the updates at the end of the transaction, the server computer system increases the efficiency with which it can build a dataset in respond to a query as a lower number of files need to be accessed.

The server computer system may receive a request to close the streaming transaction from an application and/or computing device with permissions to make changes the to the dataset. For example, a host computing device may request that a streaming transaction is opened. The host computing device may send updates for the dataset and then request that the updates are committed. In response to the request to commit the updates, the server computer system may close the streaming transaction, increment a version number for the dataset, and remove permissions for the dataset to be altered by the host computing device.

After the streaming transaction has been closed, a subsequent transaction may be opened by the same host computing device, a different host computing device, and/or an application program executing on the server computer system. The updates from the streaming transaction may be stored in association with a transaction identifier. Thus, a request for data as of the transaction identifier of the streaming transaction would return the dataset as updated by the streaming transaction.

In an embodiment, a snapshot of the dataset may be stored between transactions. The snapshot of the dataset may include identifiers of the values in the dataset as of a snapshot identifier. For example, the server computer system may store snapshot files identifying values in the dataset as of a snapshot time. Thus, when a query is received for data from the dataset as of a particular transaction identifier, the server computer system may identify the last snapshot of the dataset prior to the transaction identifier and each transaction that has occurred after the snapshot of the dataset and up to the transaction identifier. The server computer may then build the dataset as of the transaction identifier using the snapshot of the dataset and transaction records identifying updates to the dataset at each transaction.

Query Processing

The server computer system may be programmed or configured to process queries that request data from one or more datasets stored in the server computer system. For example, a host computing device may create, via user input or a programmatic call from an application instance, an external system, or an external program, a request for data from a dataset. For example, a host computing device may execute a financial application which requests data from a financial dataset stored on a server computer system.

The server computer system may be programmed or configured to analyze the query, access a relevant dataset, build the dataset using transaction records, and respond to the query using data from the dataset. For example, the server computer system may determine a query time for the query. The query time may be related to the time the query was received and/or a time specified by the query. For example, a query may identify a particular transaction identifier to use as the query time.

Based on the query time, the server computer system may identify a most recent snapshot of the dataset. For example, if the query time is not specified, the server computer system may identify the last snapshot of the dataset as the most recent snapshot of the dataset. The server computer system may additionally identify one or more transactions that have been committed to the dataset since the most recent snapshot of the dataset. The server computer system may apply the transactions to the most recent snapshot of the dataset to build a current version of the dataset. The server computer system may then respond to the query using the data from the dataset.

In an embodiment, in response to receiving a query to a dataset, the server computer system determines whether there is an open streaming transaction for the dataset. If the server computer system identifies an open streaming transaction, the server computer system may identify a state of the dataset within the open streaming transaction for responding to the query. For example, the server computer system may identify data indicating that a streaming transaction is open for the dataset. In response to determining that a streaming transaction is open for the dataset, the server computer system may build the dataset using updates that have occurred within the streaming transaction. For example, the server computer system may build the dataset using the snapshot of the dataset and subsequent transactions as described above. The server computer system may then identify updates in the open streaming transaction and apply the updated to the build of the dataset.

Referring again to FIG. 2, when a query is received, the server computer system accesses files 230 in dataset 225 that has been updated in the open streaming transaction 245. The query returns data to the query that has been updated within the open streaming transaction 245 instead of providing only the files 205 that were updated as of the most recent version number.

By recognizing streaming transactions as open transactions that can be queried, the server computer system can benefit from a transaction-based system while providing more complete responses to queries. For example, transactions may be held open for hours at a time to constantly stream updates to a dataset. While the updates are being streamed to the dataset, a host computing device may be able to query the updates in real-time without requiring the transaction to commit. When the transaction commits, a transaction identifier may be stored in association with the updates that occurred during the open transaction, thereby allowing for more efficient building of a dataset using transaction records from each transaction and allowing for a query to specify a version of the dataset to view based on transaction identifiers.

In an embodiment, the server computer system is programmed or configured to process many queries for a particular dataset. For example, a program executing on the host computing device may be programmed or configured to display time series data as it is updated. The host computing device may send a new query to the server computer system at regular intervals, such as each second. The server computer system may be programmed or configured to respond to each query using data from the most recently closed transaction and/or from an open streaming transaction. As data is updated in a dataset during an open streaming transaction, the data provided to subsequent queries may change. Thus, although the open streaming transaction has not committed, the server computer system may provide up to date responses to queries based on the most recent updates.

In an embodiment, the server computer system is programmed or configured to only respond to queries with completed updates in the open streaming transaction. For example, during an open streaming transaction, the server computer system may receive a first portion of a file. If a query is received before the rest of the file is received, the server computer system may respond to the query without using the portion of the file. In an embodiment, when a portion of a file is received, the portion of the file is stored in temporary storage and an update is not applied to the dataset based on the portion of the file. When a query is received by the server computer system targeting a dataset with an open query transaction, the server computer system may respond with updates that have been applied to the dataset, but not with the portion of the file stored in the temporary storage. When the remainder of the file is received, the file may be used to update the dataset. If a subsequent query is received, the server computer system may respond to the subsequent query with updates that have been applied to the dataset which include the received file.

Dependencies

In an embodiment, datasets may claim dependency to other datasets. For example, a first dataset may be stored on the server computer system. The server computer system may perform one or more transactions to transform the first dataset into a second dataset. For example, the server computer system may transform a dataset of measurements from English Engineering units to SI units. The server computer system may store both the first dataset in English Engineering units and the second dataset in SI units. The server computer system may additionally store data indicating that the second dataset is dependent on the first dataset. The data indicating that the second dataset is dependent on the first dataset may be stored as metadata for the first dataset, metadata for the second dataset, or metadata in both the first dataset and second dataset. For example, the first dataset may comprise metadata indicating that the second dataset is dependent on the first dataset and/or the second dataset may comprise metadata indicating that the second dataset is dependent on the first dataset.

In an embodiment, the server computer system propagates changes along datasets based on dependencies. For example, the server computer system may receive a request to open a first streaming transaction for a first dataset. In response to receiving the request, the server computer system may identify one or more second datasets that claim dependency to the first dataset. The server computer system may open streaming transactions for the first dataset and the one or more second datasets. When the first dataset is updated, those updates may be propagated to the one or more second datasets. For example, if a value in the English Engineer unit dataset is updated, that update may be converted into SI units and applied to the SI unit dataset in an open streaming transaction for the SI unit dataset.

The server computer system may be configured to open a plurality of streaming datasets in addition to a first dataset in response to a request to open a streaming transaction for the first dataset. For example, if a second dataset claims dependence to a first dataset and a third dataset claims dependence to the second dataset, the server computer system may open a streaming transaction for the first dataset, the second dataset, and the third dataset in response to a request to open a streaming transaction for the first dataset. Changes to the first dataset may be propagated from the first dataset to the second dataset and from the second dataset to the third dataset.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
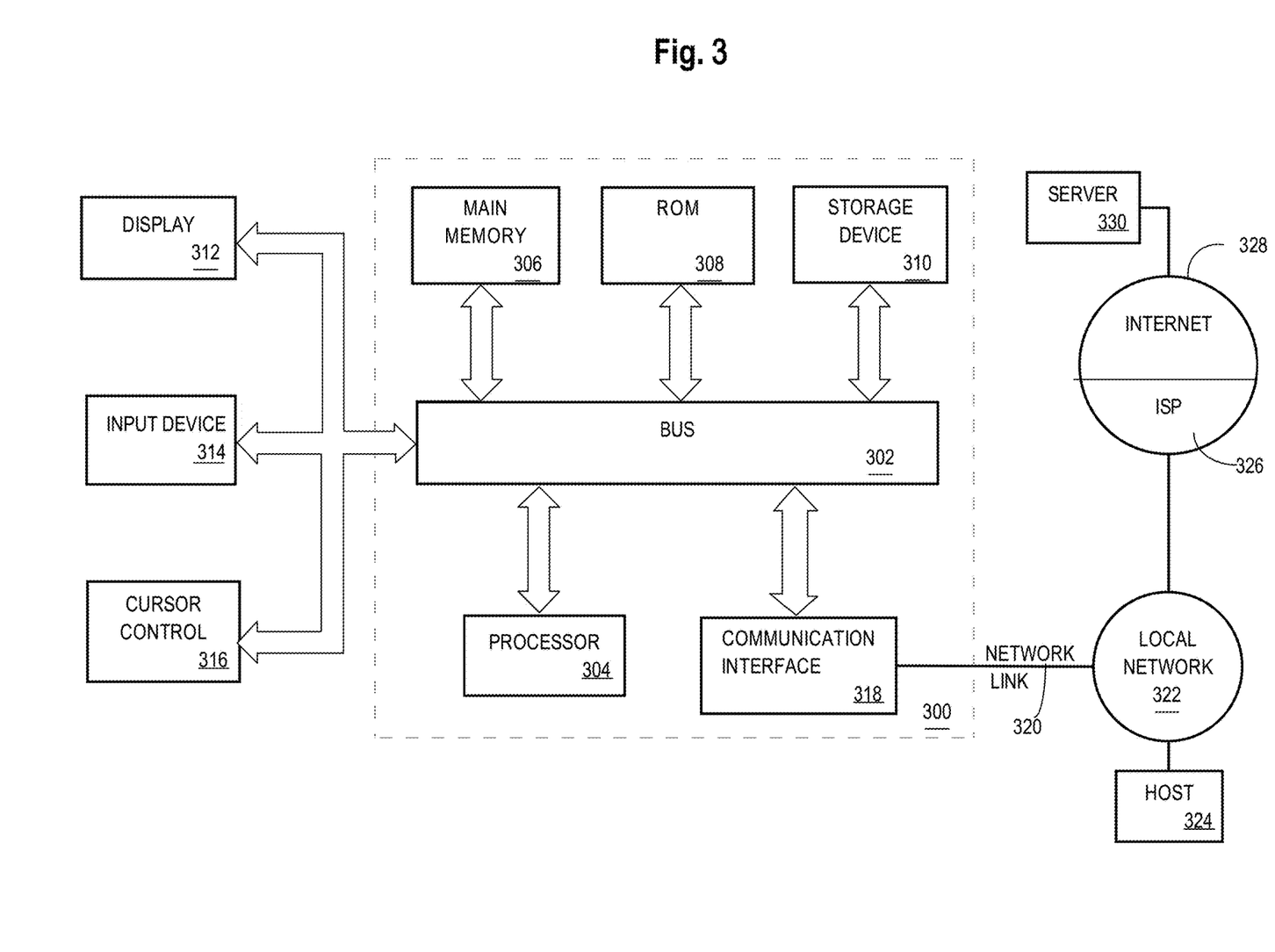
FIG. 3 is a block diagram that illustrates a computer system upon which an embodiment may be implemented.

For example, FIG. 3 is a block diagram that illustrates a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. Per one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world-wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Implementation Example—Basic Software System

Figure 4:
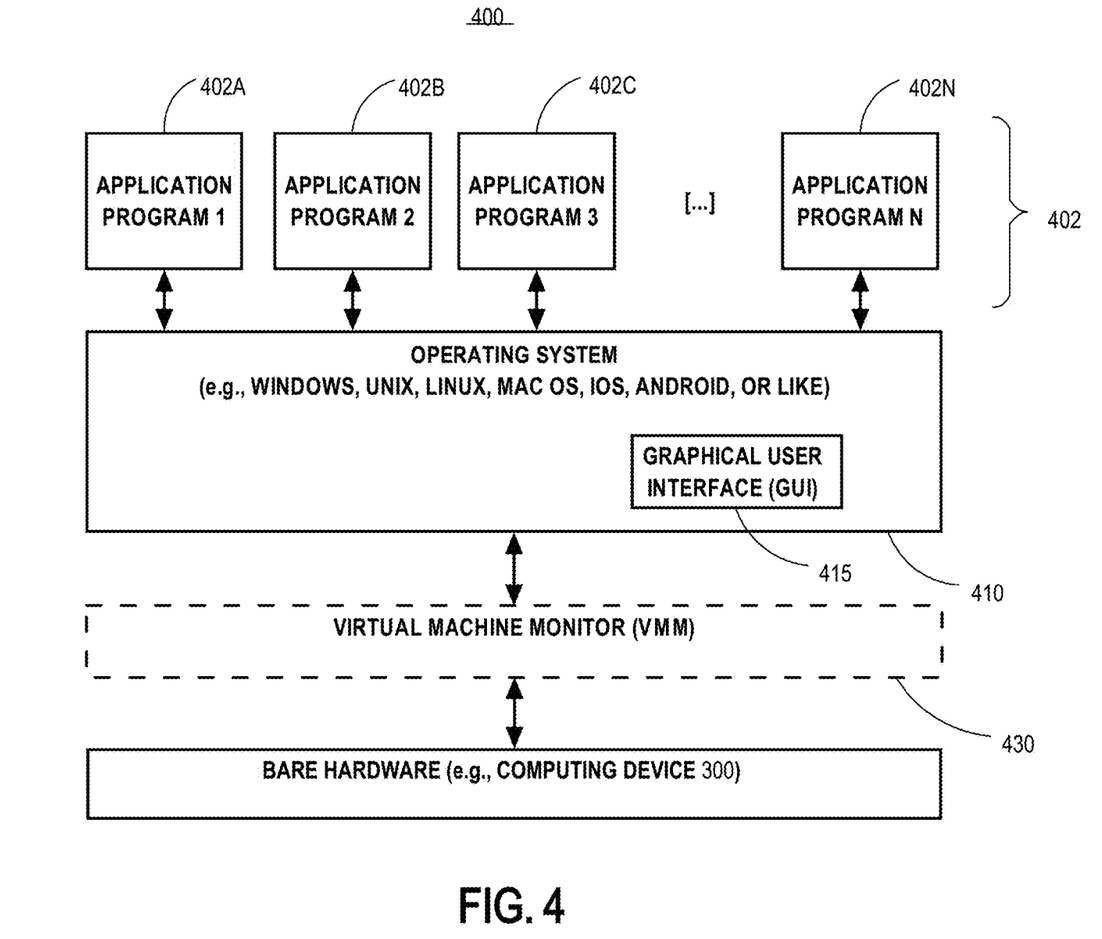
FIG. 4 is a block diagram of a basic software system that may be employed for controlling the operation of a computing device.

FIG. 4 is a block diagram of a basic software system 400 that may be employed for controlling the operation of computing device 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing device 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on device 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of device 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the device 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of device 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

EXTENSIONS AND ALTERNATIVES

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
   storing a dataset comprising a plurality of files, wherein the dataset comprises a corresponding version number;
   receiving a command to modify the dataset;
   in response to receiving the command to modify the dataset, starting a streaming transaction for the dataset;
   during the streaming transaction, receiving a plurality of updates to the dataset, wherein each update of the plurality of updates modifies one or more files of the plurality of files, wherein the plurality of updates comprises a first update to the dataset and a second update to the dataset;
   during the streaming transaction, executing, in the dataset, each update of the plurality of updates as it is received without modifying the corresponding version number of the dataset;
   during the streaming transaction, receiving a first update that adds a portion of a particular file;
   storing the portion of the particular file separately from the dataset;
   after receiving the first update, but before receiving the second update, receiving a query to the dataset at a query time;
   identifying a state of the dataset at the query time, wherein the state of the dataset includes one or more updates to the dataset of the plurality of updates to the dataset, but does not include updates based on the portion of the particular file;
   responding to the query using the state of the dataset at the query time
   receiving the second update that adds a remaining portion of the particular file;
   in response to receiving the remaining portion of the particular file, updating the dataset using the particular file;
   committing the streaming transaction to the dataset, wherein committing the streaming transaction comprises incrementing the corresponding version number of the dataset;
   wherein the method is performed using one or more processors.

2. The method of claim 1, further comprising:
   in response to committing the streaming transaction to the dataset, aggregating the plurality of updates to the dataset into one or more update files;
   storing the one or more update files with the dataset.

3. The method of claim 1, further comprising:
   after receiving the second update, but before committing the streaming transaction to the dataset, receiving a second query to the dataset at a second query time;
   identifying a second state of the dataset at the second query time, wherein the second state of the dataset includes updates based on the particular file;
   responding to the second query using the second state of the dataset at the second query time.

4. The method of claim 1, further comprising:
   in response to receiving the command to modify the dataset, identifying a second dataset that is dependent on the dataset;
   starting a second streaming transaction for the second dataset;
   using the plurality of updates to the dataset, generating a second plurality of updates for the second dataset;
     executing, in the second dataset, each update of the second plurality of updates without modifying a second corresponding version number of the second dataset;
     committing the second streaming transaction to the second dataset, wherein committing the second streaming transaction comprises incrementing the second corresponding version number of the second dataset.

5. A system comprising:
   one or more processors;
   a memory storing instructions which, when executed by the one or more processors, cause performing:
   storing a dataset comprising a plurality of files, wherein the dataset comprises a corresponding version number;
   receiving a command to modify the dataset;
   in response to receiving the command to modify the dataset, starting a streaming transaction for the dataset;
   during the streaming transaction, receiving a plurality of updates to the dataset, wherein each update of the plurality of updates modifies one or more files of the plurality of files, wherein the plurality of updates comprises a first update to the dataset and a second update to the dataset;

during the streaming transaction, executing, in the dataset, each update of the plurality of updates as it is received without modifying the corresponding version number of the dataset;

during the streaming transaction, receiving a first update that adds a portion of a particular file;

storing the portion of the particular file separately from the dataset;

after receiving the first update, but before receiving the second update, receiving a query to the dataset at a query time;

identifying a state of the dataset at the query time, wherein the state of the dataset includes one or more updates to the dataset of the plurality of updates to the dataset, but does not include updates based on the portion of the particular file;

responding to the query using the state of the dataset at the query time receiving the second update that adds a remaining portion of the particular file;

in response to receiving the remaining portion of the particular file, updating the dataset using the particular file;

committing the streaming transaction to the dataset, wherein committing the streaming transaction comprises incrementing the corresponding version number of the dataset.

6. The system of claim 5, wherein the instructions, when executed by the one or more processors, further cause performance of:

in response to committing the streaming transaction to the dataset, aggregating the plurality of updates to the dataset into one or more update files;

storing the one or more update files with the dataset.

7. The system of claim 5, wherein the instructions, when executed by the one or more processors, further cause performance of:

after receiving the second update, but before committing the streaming transaction to the dataset, receiving a second query to the dataset at a second query time;

identifying a second state of the dataset at the second query time, wherein the second state of the dataset includes updates based on the particular file;

responding to the second query using the second state of the dataset at the second query time.

8. The system of claim 5, wherein the instructions, when executed by the one or more processors, further cause performance of:

in response to receiving the command to modify the dataset, identifying a second dataset that is dependent on the dataset;

starting a second streaming transaction for the second dataset;

using the plurality of updates to the dataset, generating a second plurality of updates for the second dataset;

executing, in the second dataset, each update of the second plurality of updates without modifying a second corresponding version number of the second dataset;

committing the second streaming transaction to the second dataset, wherein committing the second streaming transaction comprises incrementing the second corresponding version number of the second dataset.

9. One or more non-transitory computer-readable media storing instructions which, when executed by one or more processors, cause performing:

storing a dataset comprising a plurality of files, wherein the dataset comprises a corresponding version number;

receiving a command to modify the dataset;

in response to receiving the command to modify the dataset, starting a streaming transaction for the dataset;

during the streaming transaction, receiving a plurality of updates to the dataset, wherein each update of the plurality of updates modifies one or more files of the plurality of files, wherein the plurality of updates comprises a first update to the dataset and a second update to the dataset;

during the streaming transaction, executing, in the dataset, each update of the plurality of updates as it is received without modifying the corresponding version number of the dataset;

during the streaming transaction, receiving a first update that adds a portion of a particular file;

storing the portion of the particular file separately from the dataset;

after receiving the first update, but before receiving the second update, receiving a query to the dataset at a query time;

identifying a state of the dataset at the query time, wherein the state of the dataset includes one or more updates to the dataset of the plurality of updates to the dataset, but does not include updates based on the portion of the particular file;

responding to the query using the state of the dataset at the query time receiving the second update that adds a remaining portion of the particular file;

in response to receiving the remaining portion of the particular file, updating the dataset using the particular file;

committing the streaming transaction to the dataset, wherein committing the streaming transaction comprises incrementing the corresponding version number of the dataset.

10. The one or more non-transitory computer-readable media of claim 9, wherein the instructions, when executed by the one or more processors, further cause performance of:

in response to committing the streaming transaction to the dataset, aggregating the plurality of updates to the dataset into one or more update files;

storing the one or more update files with the dataset.

11. The one or more non-transitory computer-readable media of claim 9, wherein the instructions, when executed by the one or more processors, further cause performance of:

after receiving the second update, but before committing the streaming transaction to the dataset, receiving a second query to the dataset at a second query time;

identifying a second state of the dataset at the second query time, wherein the second state of the dataset includes updates based on the particular file;

responding to the second query using the second state of the dataset at the second query time.

* * * * *